US008402129B2

(12) United States Patent (10) Patent No.: US 8,402,129 B2
Dilman et al. (45) Date of Patent: Mar. 19, 2013

(54) METHOD AND APPARATUS FOR EFFICIENT REACTIVE MONITORING

(75) Inventors: Mark Dilman, San Jose, CA (US); Danny Raz, Aberdeen, NJ (US)

(73) Assignee: Alcatel Lucent, Paris (FR)

( * ) Notice: Subject to any disclaimer, the term of this patent is extended or adjusted under 35 U.S.C. 154(b) by 2472 days.

(21) Appl. No.: 09/813,415

(22) Filed: Mar. 21, 2001

(65) Prior Publication Data

US 2002/0138599 A1 Sep. 26, 2002

(51) Int. Cl.
*G06F 15/173* (2006.01)
(52) U.S. Cl. .................. 709/224; 709/223; 709/225
(58) Field of Classification Search .................. 709/223, 709/203, 224, 229, 225
See application file for complete search history.

(56) References Cited

U.S. PATENT DOCUMENTS

| 5,459,837 | A |   | 10/1995 | Caccavale | 395/184.01 |
|-----------|---|---|---------|-----------|------------|
| 6,085,241 | A | * | 7/2000  | Otis | 709/223 |
| 6,122,664 | A | * | 9/2000  | Boukobza et al. | 709/224 |
| 6,147,975 | A |   | 11/2000 | Bowman-Amuah | 370/252 |
| 6,148,335 | A |   | 11/2000 | Haggard et al. | 709/224 |
| 6,170,009 | B1 | * | 1/2001 | Mandal et al. | 709/223 |
| 6,176,883 | B1 | * | 1/2001 | Holloway et al. | 709/223 |
| 6,219,705 | B1 | * | 4/2001 | Steinberger et al. | 709/224 |
| 6,321,263 | B1 | * | 11/2001 | Luzzi et al. | 709/224 |
| 6,363,422 | B1 | * | 3/2002 | Hunter et al. | 709/224 |
| 6,502,131 | B1 | * | 12/2002 | Vaid et al. | 709/224 |
| 6,513,065 | B1 | * | 1/2003 | Hafez et al. | 709/224 |
| 6,542,887 | B1 | * | 4/2003 | Abbott | 707/2 |
| 6,570,867 | B1 | * | 5/2003 | Robinson et al. | 370/351 |
| 6,671,724 | B1 | * | 12/2003 | Pandya et al. | 709/226 |
| 6,857,025 | B1 | * | 2/2005 | Maruyama et al. | 709/235 |

OTHER PUBLICATIONS

Jiao, J. et al., "Toward Efficient Monitoring", *IEEE J. On Selected Areas In Communications*, vol. 18, No. 5, May 2000, pp. 723-732.
De Meer et al, "Qos-Adaptation By Software Agents In the Presence of Defective Reservation Mechanisms in the Internet", *Computers and Communications, 1998, ISCC, '98 Proceedings, Third IEEE Symposium* on Athens, Greece Jun. 30-Jul. 2, 1998, Los Alamitos, CA, USA, *IEEE Comput. Soc, US*, pp. 488-492.
Ranganathan et al, "Distributed Resource Monitors for Mobile Objects", *Object-Orientation in Operation Systems, 1996, Proceedings of the Fifth International Workshop* on Seattle, WA, USA Oct. 27-28, 1996, Los Alamitos, CAL, USA, *IEEE Comput. Soc. US*, pp. 19-23.
Lazar et al, "Exploiting Virtual Reality for Network Management", Singapore ICCS/ISITA '92 'Communications on the Move' Singapore Nov. 16-20, 1992, New York, NY, USA, IEEE, pp. 979-983.

(Continued)

*Primary Examiner* — Asghar Bilgrami
(74) *Attorney, Agent, or Firm* — Wall & Tong, LLP

(57) ABSTRACT

A technique for managing network elements significantly reduces the amount of monitoring related traffic by using a combination of aperiodic polling and asynchronous event reporting. A global resource (e.g., a network of interconnected nodes or resources) is partitioned into a plurality of separate nodes, giving a fixed resource budget to each of the nodes. When any of the nodes exceeds its budget, based upon local monitoring at that node, the node triggers a report, typically sending a message to a central manager. In response, the central manager then and only then issues a global poll of all (or substantially all) of the nodes in the network. A rate based technique can also be used to monitor resource usage at the nodes, and send a message to a central monitoring location only when the rate at which the value of a local variable changes is too high.

9 Claims, 4 Drawing Sheets

OTHER PUBLICATIONS

Enhanced Method for Monitoring Critical Resources in Token Ring Networks, IBM Technical Disclosure Bulletin, IBM Corp., New York, US, vol. 40, No. 1, 1997, pp. 111-121.

A. Kumar et al., "A Reliability Enhancement Approach for Computer Networks and Distributed Applications," Proc. of the Int. Phoenix Conference on Computers and Communications, Tempe, Mar. 23-26, 1993, N.Y., IEEE, vol. Conf. 12, pp. 181-187.

European Search Report, Application No. 04028967.1-1244, Jul. 5, 2005.

* cited by examiner

SIMPLE VALUE NODE PROCESS

SIMPLE RATE NODE PROCESS

SIMPLE VALUE CENTRALIZED PROCESS

SIMPLE RATE CENTRALIZED PROCESS

ADVANCED RATE NODE PROCESS

ADVANCED VALUE NODE PROCESS

ADVANCED VALUE CENTRALIZED PROCESS

METHOD AND APPARATUS FOR EFFICIENT REACTIVE MONITORING

FIELD OF THE INVENTION

The present invention relates generally to monitoring of network elements in connection with arrangements for network management, and, in particular, to a technique for efficient reactive monitoring of a plurality of network elements as might be found in an Internet or intranet environment.

BACKGROUND OF THE INVENTION

Efficient network management assumes having reliable information about the managed system. The only way to maintain such information at the management station is a continuous monitoring of the system parameters which affect management decisions. The increasing complexity of managed systems and services provided by them generates a need for monitoring of more and more parameters. If the managed system is a network, the same links are often used to transfer both the payload and the monitoring data. In this case, the volume of the monitoring data being transferred directly impacts performance of the managed system. Therefore minimizing the amount of monitoring related traffic in such networks is an important goal.

One can distinguish between two types of monitoring: statistical monitoring and reactive monitoring. In statistical monitoring, the management station derives some statistical properties, which are often used to predict some future trends, from the "raw" data. This basically means that all the "raw" data has to be transferred to the management station. In such a case, the potential for reducing the monitoring traffic is not large, since all data must arrive at the management station.

With reactive monitoring, the management station needs information about the network state in order to react (in real or semi-real time) to certain alarm conditions that may develop in the network. Such conditions usually indicate either a fault or some anomalous behavior which may cause a fault later on. In this case, there is a good chance of finding a mechanism which minimizes the amount of data transferred to the management station.

Two basic techniques are used for reactive network monitoring: polling and event reporting (see William Stallings, SNMP, SNMPv2, SNMPv3, RMON1 and 2, Adison Wesley, 1998). Polling is a process in which the management station sends requests to network elements in order to obtain the state information. Typically, polling is done periodically, with the fixed frequency determined by the time window within which the alarm condition has to be detected. Event reporting is a process where a local event in a network element triggers a report, that is sent by that element to the management station. In many practical network management applications, asynchronous traps can be defined on network elements so that event reporting can be used instead of explicit polling. This can be more efficient, since an event is generated only when the value of a state variable of a network element reaches a certain threshold. However, in many cases there is a need to monitor a global system parameter which is defined as a function of local properties of different network elements. In order to monitor such global parameters using event reporting, local traps have to be emitted continuously with the fixed frequency, which makes the event reporting as expensive as periodic polling.

Recently, a new theoretical framework for minimizing polling in the case of reactive monitoring was described in an article by Jia Jiao, Shamim Naqvi, Danny Raz, and Binay Sugla, entitled "Toward efficient monitoring", IEEE Journal on Selected Areas in Communications, 18 (5):723-732, May 2000. The approach described by Jiao et al. is based on the fact that the evolution of state variables is usually restricted by some constraints. Taking those constraints into account allows the management station to predict the future state based on the past information and perform polling aperiodically, only when there is a possibility of an alarm condition. The framework in Jiao et al. deals only with polling. Accordingly, that technique is not able to realize the efficiency needed to successfully manage a real network with a large number of elements.

SUMMARY OF THE INVENTION

In accordance with the present invention, a technique for managing network elements significantly reduces the amount of monitoring related traffic by using a combination of aperiodic polling and asynchronous event reporting.

In accordance with one embodiment of the present invention, our technique partitions a global resource across a plurality of separate nodes, giving a fixed resource budget to each of the nodes. When any of the nodes exceeds its budget, based upon local monitoring at that node, the node triggers a report, typically sending a message to a central manager, also known as a network management station. In response, the central manager then and only then issues a global poll of all (or substantially all) of the nodes in the network. The nodes can be switches, routers, bridges, firewall devices, and/or other similar network elements, as well as application level elements, such as servers, hosts, and/or layer 4-7 switches.

In accordance with another embodiment of the present invention, a rate based technique is arranged such that a local element (node) monitors its own resource usage locally, and reports (i.e., sends a message to a central monitoring location) only when the rate at which the resource usage, as measured by a value of a local variable, changes, e.g., is too high. This allows the central manager to assume that as long as no report was received, the resource usage change rate at each node is bounded. Again, when the node triggers a report, the central manager then and only then issues a global poll of all (or substantially all) of the nodes in the network.

BRIEF DESCRIPTION OF THE DRAWING

The present invention will be more fully appreciated by consideration of the following detailed description, which should be read in light of the accompanying drawing in which.

DETAILED DESCRIPTION

Figure 1:
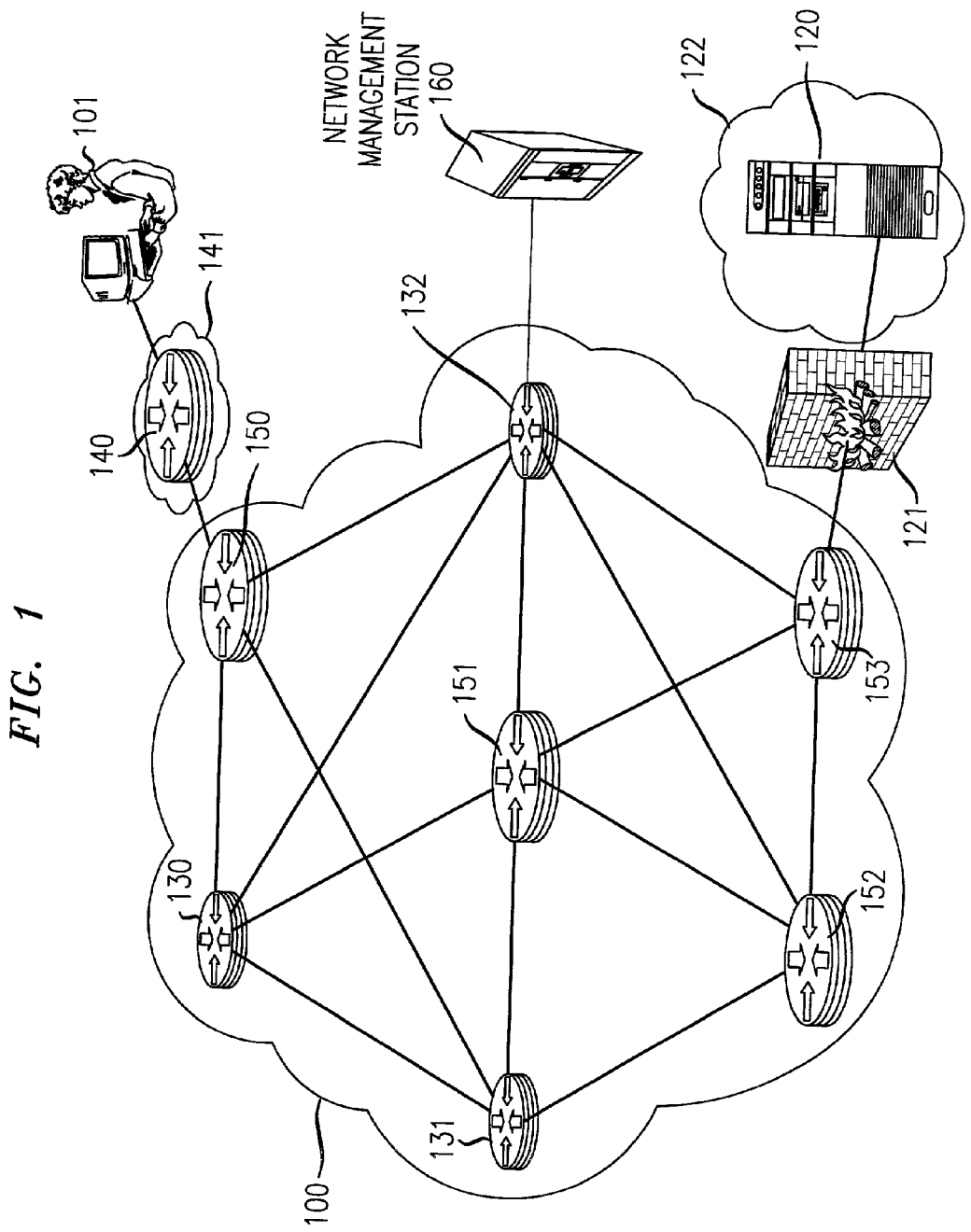
FIG. 1 is a block diagram illustrating a network of interconnected nodes, and a network management station arranged to monitor and control resource usage at the nodes in accordance with the principles of the present invention.

Before proceeding with a description of the details of the present invention, it is useful to put the invention in context by describing a number of applications where the invention can be used.

First, the invention can be used to monitor network traffic. For example, a network management application can be used to monitor the overall amount of traffic from an organization sub-network to the Internet. Once this amount exceeds some threshold, certain actions should be taken to ensure adequate service for the organization customers. Such actions may include: activating backup lines, distributing more context from the organization web servers to their context delivery contractor, or restricting employees access to the Internet. Note that the organization may be connected to the Internet via several links, each located in a different site, and the function that is of interest is the sum of the local variables.

Second, the invention can be used to mirror load. For example, an organization Web site may be distributed among several mirror sites. In order to optimize customer service and increase the sales, there is need to know which are the most popular pages. In other words, it is desirable to know (in real time in order to react) when the overall number of hits in the last 5 minutes, for a specific page exceeds some number. Note that again, it is desirable to know when a function which is the sum of distributed values exceeds a threshold.

Third, the invention can be used to fight denial of service attacks. In order to fight a denial of service attack, the number of SYN packets arriving at the organization network is counted. Again, an action should be taken when the total number of such packets in a given time interval, for example, the last minute, is too large.

Fourth, the invention can be used in connection with licensing information. In many cases, software licensing allows only a restricted number of users to use certain software at any given time. If the software is installed in many machines, maintaining the actual number of active copies may be come problematic. Note that it is not really necessary to know the actual number of users, but only to be alerted when this number exceeds the license threshold.

Finally, the invention can be used in connection with traffic engineering. In many proposed architectures, a central entity (for example, a bandwidth broker) is in charge of provisioning the quality of service (QoS) parameters of the routers in a sub network, and of negotiating with neighbor networks and/or incoming flows the possible level of service available. In order to do it in a cost effective way, the Bandwidth Brokers should receive feedback from the routers regarding the QoS parameters for the different flows. In many cases, the relevant information is just the sum of several variables from different routers (e.g. the total delay of a flow is the sum of the actual delay in each router on its path), and it is only important when this value is too big.

Note that the characterization of the data varies: the amount of different locations can vary from a few in the first two examples to several thousands in the last two, and the rate in which the data changes varies significantly among the different examples. However, in all the above examples there is a need to be alerted when the sum of several variables, each obtained in a different network location, exceeds a predefined threshold. Of course one can deploy a central algorithm that will poll all nodes periodically and will generate alarms as needed. The problem is how to achieve the same functionality with the least possible communication cost.

In order to fully appreciate the techniques of the present invention, it is advantageous to first understand the network environment in which the present invention is intended to operate, and the assumptions that underly the invention. Specifically, we assume that we are given n real-valued variables $x_1, x_2, \ldots, x_n$. For each $x_1$, we are given a fixed positive cost $c_1$, representing the cost of measuring $x_1$ at any time. Time t is an integer, beginning at t=1. Let $x_1(t)$ denote the value of $x_1$ at time t. We are also given a global function $f(x_1, x_2, \ldots, x_n)$. The value of $f$ at time t, $f_1 = f(x_1(t), x_2(t), \ldots, x_n(t))$ depends only on the values of the $x_1$s at a single time, t. We also associate with $f$ a global threshold value T. When the value of $f$ exceeds this threshold, an alarm condition occurs. The alarm condition evaluation is done at node 0 by a centralized manager. The values of the different variables $x_1(t)$ are not necessarily known at this node.

We distinguish between two different methods to get information related to the values of these variables, namely polling and event reporting.

1. Polling: the centralized manager is polling one or more variables. The decision to poll and the exact subset of the variables to be polled, is a result of a computation based on the information available to the centralized manager.
2. Event reporting: a node initiates a report that may contain the value of the variable $x_1(t)$. The report is triggered by some local event, which is a result of a local computation based on the values of $x_1(t)$.

We are interested in minimizing the communication cost required in order to detect alarm conditions. That is, we would like to minimize the measuring cost, but still detect alarm conditions as soon as they hold. Note that we mainly consider communication complexity and do not consider the computational complexity of the algorithm or the complexity of computing the events that trigger the local event. We also assume that communication is reliable and that the (communication) cost of polling variable $x_1$ is the same as the (communication) cost of sending an event report for that variable.

The process that decides which variables to measure, based upon values obtained in the past and the local event reporting, together with the process that triggers the local event reporting, is together the monitoring process of the present invention. The monitoring process is "correct", i.e., it is operating as desired, if it always detects alarm conditions, and is "optimal" if its cost is always no larger than the cost of any other correction algorithm. The goal of the present invention is therefore to have a monitoring process that is both correct and optimal.

In the following description, we concentrate on the case where $f = \Sigma u_1 x_1$. This is both an important function by itself, and is general enough to capture much of the insight of the problem. Note that by using the log function, this case also covers functions like $f = \pi_1 x_1$. We assume for simplicity that the costs are identical for all nodes, the range of all local variables $x_1$ is the same, and the weights are one. We also assume a global time synchronization, so that the individual processes at the monitored nodes and at the network management station are described in terms of steps which are assumed to be performed at essentially the same time. In practice, the time taken to perform any given step may be important, and we discuss this issue further below.

Turning now to a detailed description of the first embodiment of the present invention, it is based on partitioning of the global resource to the separate nodes, and assigning a fixed budget or value threshold to each of the nodes with respect to each monitored variable. FIG. 1 is a block diagram illustrating a network 100 of interconnected nodes 130-132 and 150-152, each of which has an assigned budget value. In a real embodiment, nodes 130-132 and 150-152 may be switches in an ATM network, some of which are connected to users such as user 101 through other networks, such as network 140 that contain other nodes, such as node 140. Other nodes, such as node 153, may be routers, bridges, or other similar network elements. Nodes can also be connected to a server 120 within a network 122 via a firewall 121. A network management station 160, connected to network 100 via node 132, is arranged to monitor and control resource usage at the other network nodes in accordance with the principles of the present invention. This network management station 160 is the centralized manager referred to above.

Figure 2:
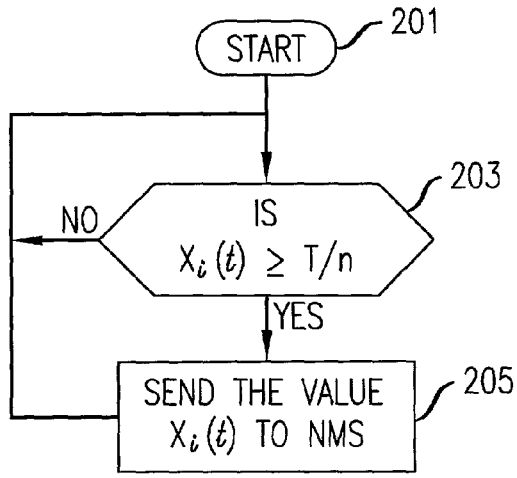
FIG. 2 is a flow diagram of the resource utilization monitoring process performed at the nodes in FIG. 1, in a first embodiment of the invention which monitors the value of the resources used.

FIG. 2 is a flow diagram of the resource utilization monitoring process performed at the nodes, such as nodes 130-132 and 150-152 in FIG. 1, in a first embodiment of the invention which monitors the value of the resources used. The process begins in step 201 and proceeds to monitor, in step 203, whether the locally monitored variable $x_1(t)$ in the node exceeds its budget T/n If a negative result occurs, the process repeats step 203, continuing the monitoring process. However, if a positive (YES) result occurs in step 203, then the process proceeds to step 205, wherein a report containing the value of the variable being monitored, $x_1(t)$, is transmitted to network management station 160. Monitoring then again continues by returning to step 203.

Figure 3:
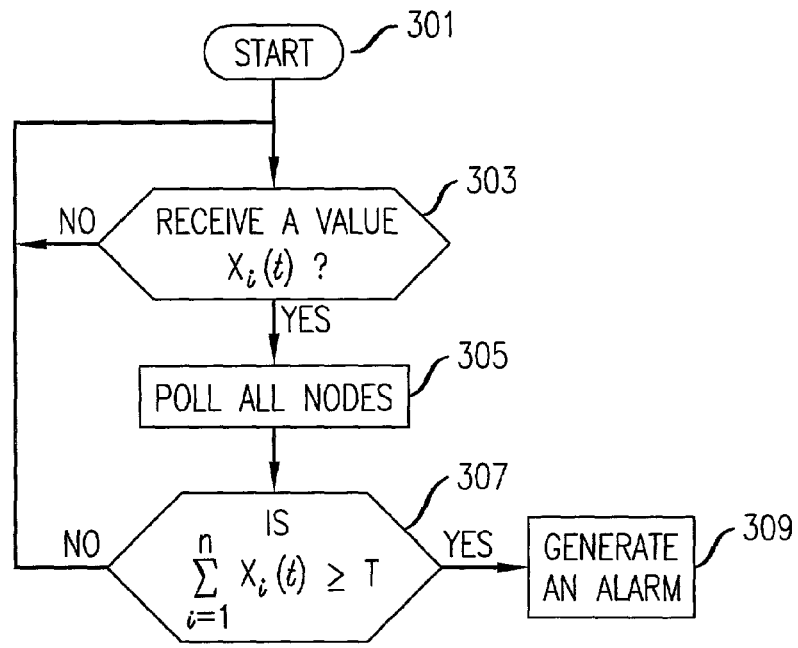
FIG. 3 is a flow diagram of the resource utilization monitoring process performed at the network management station in FIG. 1, in a first embodiment of the invention which monitors the value of the resources used.

FIG. 3 is a flow diagram of the resource utilization monitoring process performed at the network management station 160 in FIG. 1, in a first embodiment of the invention which monitors the value of the resources used. This figure is thus a companion to the process shown in FIG. 2. The process begins in step 301, and continues to step 303, in which the receipt of a report containing the value of the variable being monitored, $x_1(t)$, from any of the nodes, (as occurred in step 205 of FIG. 2) is monitored. If no such report is received, the process returns to step 303; however, if a report is received, a YES result occurs in step 303 and the process proceeds to step 305, in which the network management station 160 is directed to issue a global poll of all of the other nodes being monitored. At this point, and only then, a determination is made as to whether or not an alarm condition exists, by comparing the sum of all n values of $x_1(t)$ with a threshold T. If the sum exceeds the threshold, an alarm is generated.

From the foregoing description of FIGS. 2 and 3, it is seen that the technique of the present invention has two components, a centralized monitoring process, and a process performed in the distributed nodes. The process in the nodes is very simple: at each time t, if $x_1(t)>T$, then send the value $x_1(t)$ to the centralized manager. The centralized process is also simple: at each time t, if one or more reports is received, then (and only then) are all other nodes polled for their values. When the poll results are evaluated, if $f_1>T$ then an alarm is generated.

The second embodiment is rate based, and is arranged such that a local node or other element reports only when the rate at which the value of the monitored variables changes locally, is too high. This allows the central manager, i.e., network management station 160, to assume that as long as no report was received, the change rates at each node, i.e. the first derivative of the value of each of the local variables, is bounded. This assures that the central manager can compute a safe bound for the time of the next necessary measurement.

Figure 4:
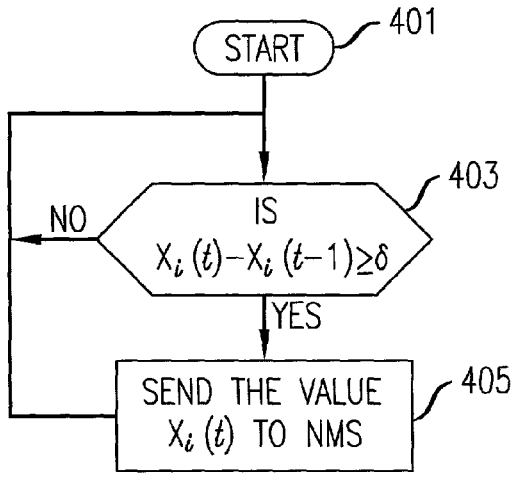
FIG. 4 is a flow diagram of the resource utilization monitoring process performed at the nodes in FIG. 1, in a second embodiment of the invention which monitors the rate of change of the resources used.
Figure 5:
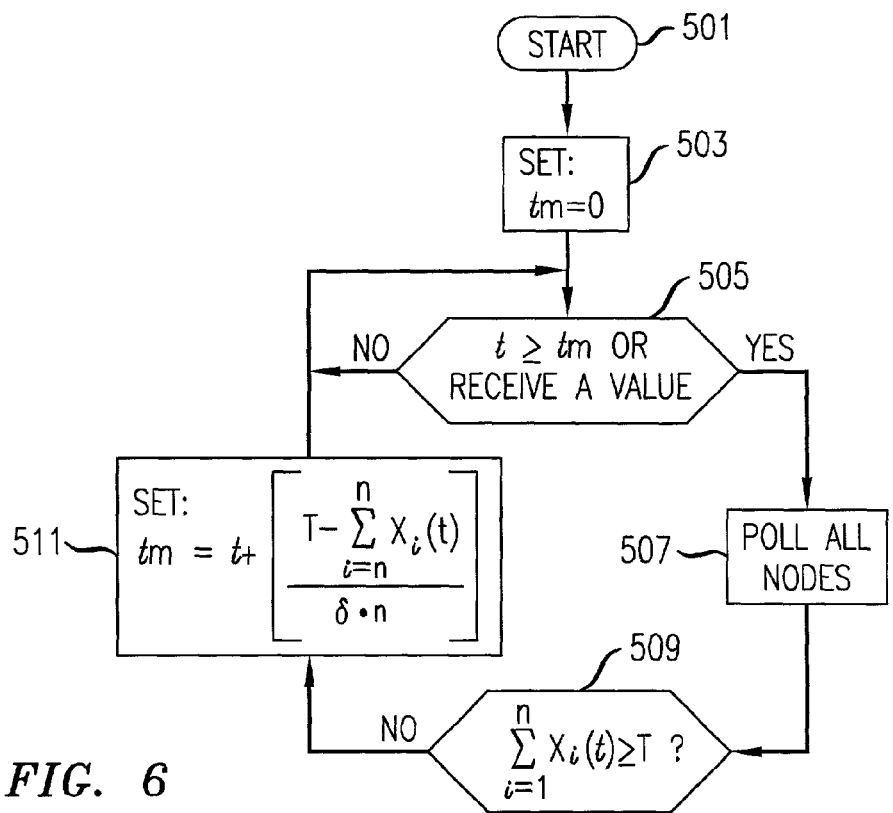
FIG. 5 is a flow diagram of the resource utilization monitoring process performed at the network management station in FIG. 1, in a second embodiment of the invention which monitors the rate of change of the resources used.

The second embodiment again has two components, namely the centralized monitoring process, a flow diagram for which is shown in FIG. 5, and the process performed in the distributed nodes, a flow diagram for which is shown in FIG. 4 The FIG. 4 process performed in the nodes is fairly simple, and begins in step 401. In step 403, at each time t, a determination is made as to whether the rate of change of the monitored variable at any node exceeds a fixed amount δ. If a NO result occurs, the process repeats step 403. However, if a YES result occurs, because $x_1(t)-x_m(i, t-1)>\delta$, then in step 405 the value $x_1(t)$ is sent to network management station 160.

The centralized process of FIG. 5 is a bit more complex The process begins in step 501, and proceeds to step 503, in which a first variable $t_m$, that indicates the next time to poll, is initialized at zero. Then, in step 505, at any time t, if $t \geq t_m$ or a report was received, the process proceeds to step 507, in which all non-reporting nodes are polled. If a NO result occurs in step 505, that step is repeated.

After all nodes are polled in step 507, the sum of all n values of $x_1(t)$ is compared with a threshold T in step 509. If the sum exceeds the threshold, an alarm is generated in step 513. Otherwise, the process proceeds to step 511, in which the value of $t_m$ is set to be $t+((T-\Sigma x_1(t)/\delta n)$. This value is the largest "safe" period, i.e., until this time ($t_m$), if no node sent a reports than the value of the function can not exceed T. The process then repeats step 505.

It is seen from the foregoing that the strategy of the processes of FIGS. 4 and 5 is to monitor the rate of change of the monitored variable $x_1(t)$. The centralized node is arranged to poll all (or a designated number of) nodes if either the rate of change exceeds a threshold, or a time interval is exceeded. The values reported by the polled nodes only causes an alarm when the cumulative value of the variable $x_i(t)$ at the polled nodes exceeds another threshold.

Figure 6:
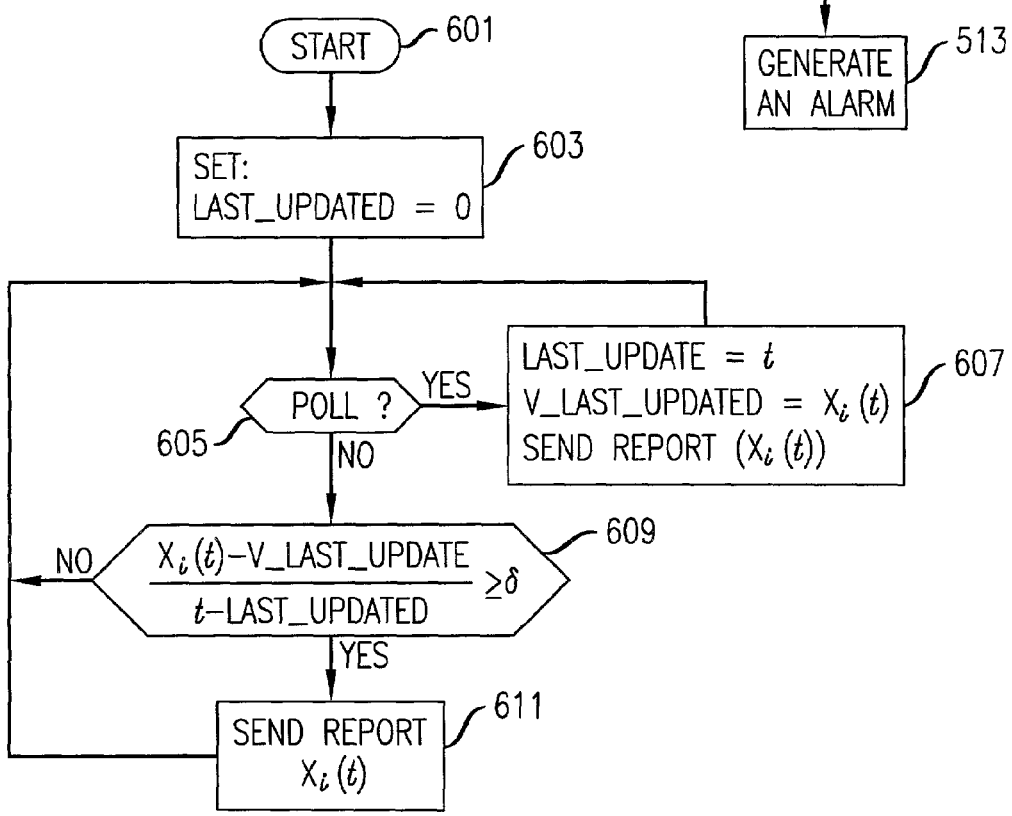
FIG. 6 is a flow diagram of the resource utilization monitoring process performed at the nodes in FIG. 1, in a yet another embodiment of the invention which monitors the rate of change of the resources used.

FIG. 6 is a flow diagram of the resource utilization monitoring process performed at the nodes in FIG. 1, in a yet another embodiment of the invention which monitors the rate of change of the resources used. The process starts in step 601 and proceeds to step 603, in which a variable last updated is initialized. This variable keeps track of the time at which a rate of change determination is made, as will be seen below. The process proceeds to step 605, in which a determination is made as to whether or not this node has been "recently" polled by network management station 160. If so, a YES result occurs in step 605, and the process proceeds to step 607, in which a report of the value $x_i(t)$ is sent to network management station 160. At the same time, the variable last_updated is set to the time that the poll occurred, and a second variable v_last_updated is set to the value of the variable $x_i(t)$ at the time the poll occurred. The process then returns to step 605.

If a NO result in step 605 occurs, the process proceeds to step 609, in which the rate of change of the variable $x_i(t)$, as compared to its value (v_last_updated) at the time of the last poll, is determined, over the time period between the current time t and the time of the last_update, last updated. In other words, it is determined in step 609 how fast the monitored variable is changing in the period since the last poll. This is different from the rate of change determined in the process of FIG. 4, which used a fixed time interval.

If the rate of change exceeds a threshold value δ, a YES result occurs in step 609, and a report of the current value of $x_i(t)$ is sent to network management station 160 in step 611, whereupon the process repeats step 605. Alternatively, if a NO result occurs in step 609, the process also repeats step 605.

The process of FIG. 6 is used with the same centralized process performed in network management station 160, that was described in connection with FIG. 5.

Figure 7:
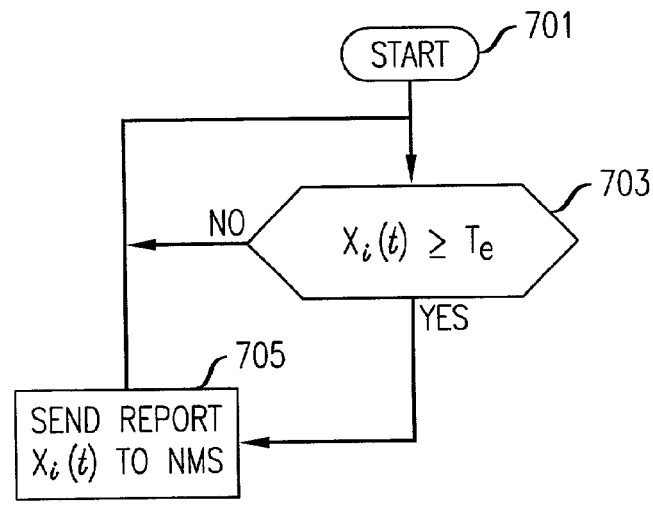
FIG. 7 is a flow diagram of the resource utilization monitoring process performed at the nodes in FIG. 1, in a yet another embodiment of the invention which monitors the value of the resources used.
Figure 8:
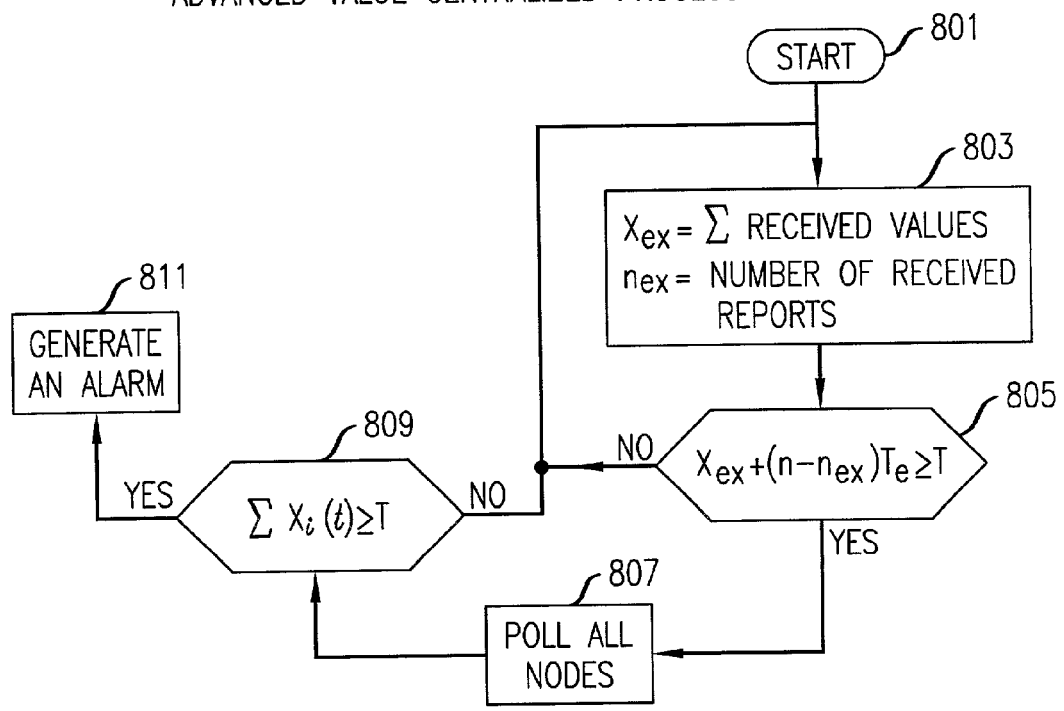
FIG. 8 is a flow diagram of the resource utilization monitoring process performed at the network management station in FIG. 1, in a yet another embodiment of the invention which monitors the value of the resources used.

Turning now to FIG. 7, there is shown a flow diagram of a resource utilization monitoring process performed at the nodes in FIG. 1, in a yet another embodiment of the invention which also monitors the value of the resources used. This process is very similar to that shown in FIG. 2, but is used in connection with the process performed at network management station 160 that is shown in FIG. 8. In FIG. 7, the process begins in step 701 and proceeds to monitor, in step 703, whether the locally monitored variable $x_i(t)$ in the node exceeds a threshold value Te, which is discussed further below. If a negative result occurs, the process repeats step 703, continuing the monitoring process. However, if a positive (YES) result occurs in step 703, then the process proceeds to step 705, wherein a report containing the value of the variable being monitored, $x_i(t)$, is transmitted to network management station 160. Monitoring then again continues by returning to step 703.

FIG. 8 is a flow diagram of the resource utilization monitoring process performed at the network management station 160 in FIG. 1, in a yet another embodiment of the invention which monitors the value of the resources used in conjunction with the process of FIG. 7. The process begins in step 801 and proceeds to step 803, in which two values are calculated, as follows: $X_{ex}$ is the sum of the value of the monitored values received from any reporting nodes, and $n_{ex}$ is the number of such reporting nodes. Next, a determination is made in step 805 as to whether the sum of the values of the reporting nodes, $X_{ex}$ plus an upper bound of the value for the non-reporting nodes, given by $(n-n_{ex})$ Te, exceeds a threshold T. If so, a YES result occurs in step 805, and the process proceeds to step 807, in which all nodes are polled. Then, in step 809, a determination is made as to whether the sum of the monitored variables for all (or selected ones) of the nodes exceeds the threshold T. If YES, an alarm is generated in step 811. Otherwise, the process returns to repeat step 803. Note that if the result in step 805 is NO, the process also returns to and repeats step 803.

The advantage of the process of FIGS. 7 and 8 is as follows: In some cases the probability that usage of a single station will exceed the value assigned to it, is high. In such a case a global poll will be performed by the process described in FIGS. 2 and 3 often, making it inefficient. In this new process one can tune the process to the data behavior by modifying the tunable parameter Te. In this way using the process of FIGS. 7 and 8 allow us to monitor in an even more efficient way.

The present invention enables practical efficient monitoring of resources, by combining a central monitoring algorithm with simple local constraint verification. The invention fits naturally into the SNMP framework, and can be used to save a significant amount of the monitoring overhead. While the tailoring of optimal performing monitoring techniques depends on the data characterization, the amount of saving achieved by the present invention can be very significant. Also, the performance of the techniques of the present invention (i.e. the amount of messages needed to guarantee detection of all alarm conditions), depends heavily on the statistical characterization of the collected data, and the number of different nodes. However, for real network traffic, in an environment similar to the case described in the first example above, the amount of saving in monitoring traffic can be up to 97%.

Various modifications to the embodiments just described are possible, and are within the scope of the present invention. Accordingly it is intended that the invention be limited only by the appended claims.

The invention claimed is:

1. A method for monitoring usage of resources allocated to a plurality of nodes of a network, comprising the steps of:
   assigning a parameter to each of a plurality of nodes of the network, wherein each parameter is indicative of a rate of change of usage of said resources of the node;
   locally monitoring, at each of the nodes, the rate of change of the usage of said resources of the node;
   reporting to a centralized management station of the network when the rate of change of the usage of the resources of one of the nodes exceeds a first threshold;
   initiating a poll of resources of nodes of the network by the centralized management station in response to reporting from the node or a time interval being exceeded;
   determining whether a sum of the currently reported rates of change of usage of node resources, received in response to the poll initiated by the management station, exceeds a second threshold; and
   generating an alarm if the sum of the currently reported rates of change of usage of node resources exceeds the second threshold, else updating the time interval.

2. The method of claim 1, further including the step of adjusting the usage of the resources at one or more of said nodes.

3. A method for monitoring usage of a resource in nodes of a network, comprising the steps of:
   (a) monitoring usage of the resource in a node to determine when a rate of change of the usage exceeds a first predetermined threshold;
   (b) reporting to a management station of the network when the rate of change of the usage exceeds said first predetermined threshold; and
   (c) initiating a poll of resources in the nodes of the network by the management station in response to reporting from the node or a time interval being exceeded.

4. A method for monitoring usage of resources in nodes of a network, comprising the steps of:
   asynchronous reporting of an event to a management station of the network when a rate of change of a usage of at least one resource of said resources in any of said nodes deviates from a prescribed norm; and
   periodic polling of said nodes in accordance with a polling interval, and aperiodic polling of said nodes in response to reporting of said event, wherein a tunable parameter is adjusted in response to the usage.

5. A method for managing a global resource of a network in order to reduce the amount of monitoring related traffic, comprising the steps of:
   assigning a local threshold to each of a plurality of node resources of a respective plurality of nodes of the network;
   reporting to a management station of the network when a value indicative of node resource usage exceeds the assigned local threshold as determined using local monitoring of the node resource;
   initiating a poll, by the management station, of node resource usage by the nodes of the network in response to a determination that a sum of previously reported values indicative of node resource usage received from reporting nodes plus an upper bound of node resource usage for non-reporting nodes exceeds a threshold; and generating an alarm if the sum of the currently reported values indicative of node resource usage, received in response to the poll initiated by the management station, exceeds the threshold.

6. A method for managing a global resource of a network in order to reduce the amount of monitoring related traffic, comprising the steps of:

assigning a local threshold to each of a plurality of node resources of a respective plurality of nodes of the network;

reporting to a management station of the network when a rate of change of usage of said node resource exceeds the local threshold as determined using local monitoring of the node resource, wherein said rate of change of usage of said node resource is determined using a variable time interval comprising a difference between a current time and a time at which the node was last polled by the management station;

initiating a poll, by the management station, of the node resource usage of the nodes of the network in response to receiving reporting from one of the nodes or a time interval being exceeded;

determining whether a sum of the currently reported rates of change of usage of node resources, received in response to the poll initiated by the management station, exceeds a threshold; and generating an alarm if the sum of the currently reported rates of change of usage of node resources exceeds the threshold.

7. The method defined in claim 4 wherein said nodes are selected from the group consisting of routers, switches, bridges, and firewall devices.

8. The method defined in claim 4 wherein said nodes are selected from the group consisting of servers, hosts, and layer 4-7 switches.

9. The method of claim 3, further comprising:

(d) summing all the reported rate of change of the usage of the resources; and (e) generating an alarm if the sum exceeds a second threshold, else updating the time interval.

* * * * *